US012097700B2

(12) United States Patent
Ishimatsu

(10) Patent No.: US 12,097,700 B2
(45) Date of Patent: Sep. 24, 2024

(54) LIQUID EJECTION HEAD AND MANUFACTURING METHOD THEREOF

(71) Applicant: CANON KABUSHIKI KAISHA, Tokyo (JP)

(72) Inventor: Shin Ishimatsu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 126 days.

(21) Appl. No.: 17/831,764

(22) Filed: Jun. 3, 2022

(65) Prior Publication Data

US 2022/0388305 A1 Dec. 8, 2022

(30) Foreign Application Priority Data

Jun. 15, 2021 (JP) ................................ 2021-099618

(51) Int. Cl.
*B41J 2/14* (2006.01)

(52) U.S. Cl.
CPC .. *B41J 2/14201* (2013.01); *B41J 2002/14491* (2013.01)

(58) Field of Classification Search
CPC .......... B41J 2/14201; B41J 2002/14491; B41J 2/1626; B41J 2/1632; B41J 2202/20; B41J 2/1623; B41J 2/1635; B41J 2/1603
See application file for complete search history.

(56) References Cited

U.S. PATENT DOCUMENTS

| | | | | |
|---|---|---|---|---|
| 6,220,688 | B1 | 4/2001 | Ishimatsu et al. | |
| 8,636,336 | B2 | 1/2014 | Goto | |
| 8,714,711 | B2 * | 5/2014 | Otaka | B41J 2/1623 347/64 |

FOREIGN PATENT DOCUMENTS

| | | | |
|---|---|---|---|
| JP | 2012-187804 | A | 10/2012 |

* cited by examiner

*Primary Examiner* — Lisa Solomon
(74) *Attorney, Agent, or Firm* — Venable LLP

(57) ABSTRACT

A liquid ejection head includes a print element substrate having an ejection port for ejecting a liquid; a support member supporting the print element substrate; and an adhesive agent provided for adhering the print element substrate to the support member. The print element substrate includes a supply port opposed to the support member and communicating with the ejection port, a first surface opposed to the support member and surrounding the supply port, and a second surface opposed to the support member and provided along at least a part of an outer edge of the first surface and retracted from the first surface relative to the support member. The adhesive agent is filled in a first space between the first surface and the support member, and at least a part of a second space between the second surface and the support member.

20 Claims, 11 Drawing Sheets

LIQUID EJECTION HEAD AND MANUFACTURING METHOD THEREOF

BACKGROUND OF THE INVENTION

Field of the Invention

The present disclosure relates to a liquid ejection head for ejecting a liquid such as ink to perform printing, and a method for manufacturing the same.

Description of the Related Art

The liquid ejection head has a print element substrate having an ejection port for ejecting a liquid and a support member for supporting the print element substrate, and the print element substrate is adhered to the support member with an adhesive agent. Japanese Patent Application Laid-Open No. 2012-187804 discloses a liquid ejection head in which a groove portion is provided outside an adhered surface of a print element substrate, adhered with the support member and at a position lower than the adhered surface. By covering the adhered surface with the seal material, the print element substrate is restrained by the seal material, and the print element substrate may be damaged. The groove portion receives the seal material and suppresses a range covered with the seal material of the print element substrate. Thus, the effect of restricting the print element substrate by the seal material is suppressed, and the possibility of damaging the print element substrate is reduced.

When the print element substrate is adhered to the support member, an adhesive agent is previously provided in a predetermined region of the support member, and the adhesive agent is pressed by the print element substrate. As a result, the adhesive agent spreads to the adhered surface of the print element substrate, and reliable adhering is possible. At this time, a part of the remaining adhesive agent spreads to the outer wall of the print element substrate. The adhesive agent absorbs the liquid and swells to push the print element substrate. Since a cavity serving as a liquid supply portion is formed inside the print element substrate, the print element substrate may be deformed inward and damage possibly may occur. As disclosed in Japanese Patent Application Laid-Open No. 2012-187804, the formation of the groove portion adjacent to the adhered surface reduces the amount of adhesive agent adhering to the outer wall of the print element substrate, but the formation of the groove portion may limit the miniaturization of the print element substrate.

SUMMARY OF THE INVENTION

One of objects of the present disclosure is to provide a liquid ejection head which hardly causes damage of a print element substrate by an adhesive agent and has small restriction of miniaturization.

According to one aspect of the present disclosure, a liquid ejection head comprises: a first print element substrate having an ejection port for ejecting a liquid; a support member configured to support the first print element substrate; and an adhesive agent provided between the first print element substrate and the support member for adhering the first print element substrate to the support member, wherein the first print element substrate includes a supply port opposed to the support member and communicating with the ejection port, a first surface opposed to the support member and surrounding the supply port, and a second surface opposed to the support member, provided along at least a part of an outer edge of the first surface, and retracted from the support member relative to the first surface, and wherein the adhesive agent is filled in a first space between the first surface and the support member, and at least a part of a second space between the second surface and the support member.

According to one aspect of the present disclosure, a liquid ejection head which hardly causes damage of a print element substrate by an adhesive agent and has small restriction of miniaturization, can be provided.

Further features of the present invention will become apparent from the following description of exemplary embodiments with reference to the attached drawings.

DESCRIPTION OF THE EMBODIMENTS

Some embodiments of the present disclosure will now be described with reference to the drawings. Although the following embodiments describe an inkjet head for ejecting ink, the present disclosure can be widely applied to a liquid ejection head for ejecting liquid other than ink. In the following embodiments, the X direction means a direction parallel to the long side of the print element substrate or the longitudinal direction of the print element substrate, and the Y direction means a direction parallel to the short side of the print element substrate or the lateral direction of the print element substrate. The Z direction means the direction perpendicular to the X and Y directions.

First Embodiment

Figure 1:
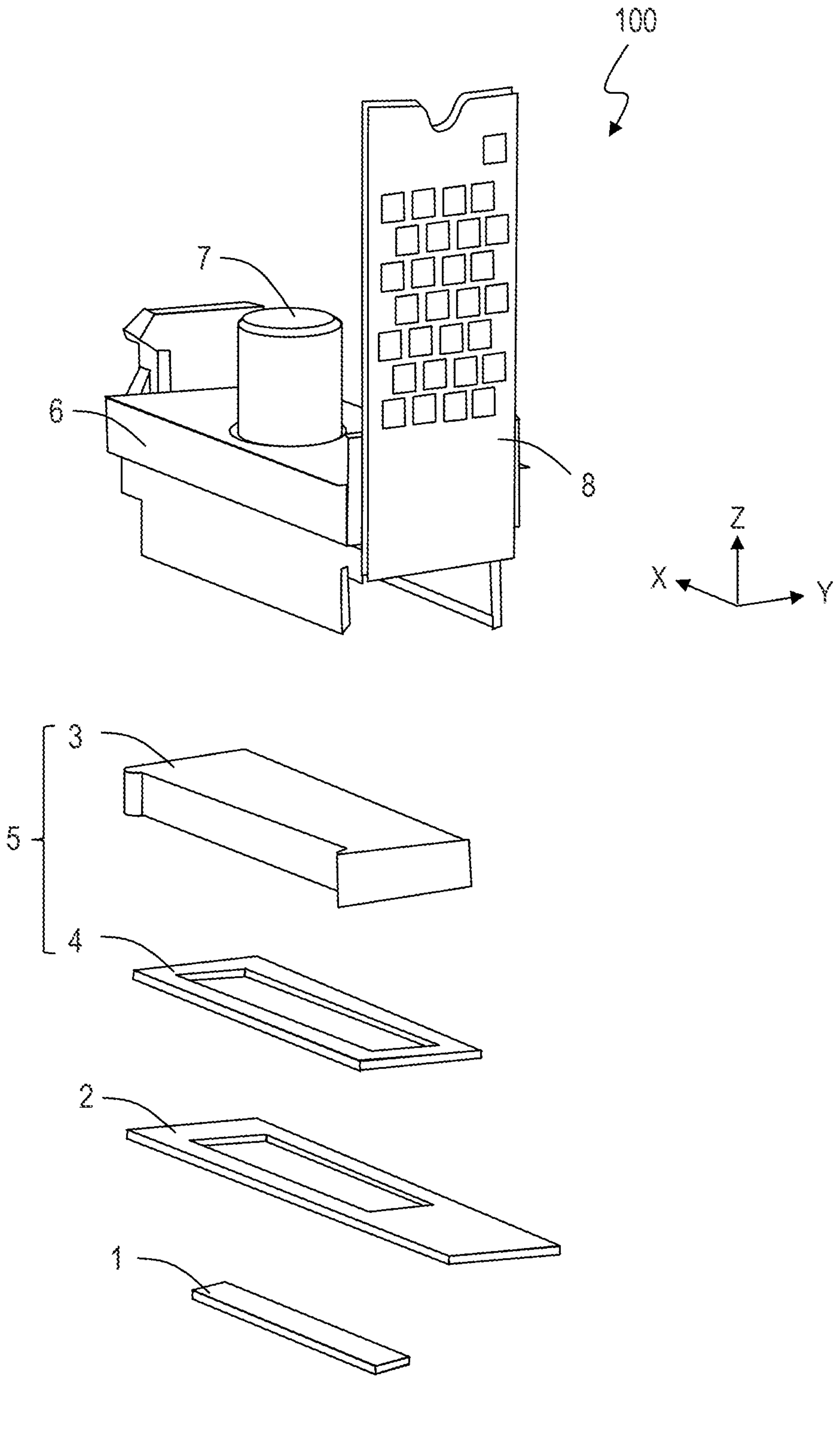
FIG. 1 is an exploded perspective view of a liquid ejection head according to a first embodiment.
Figure 2A:
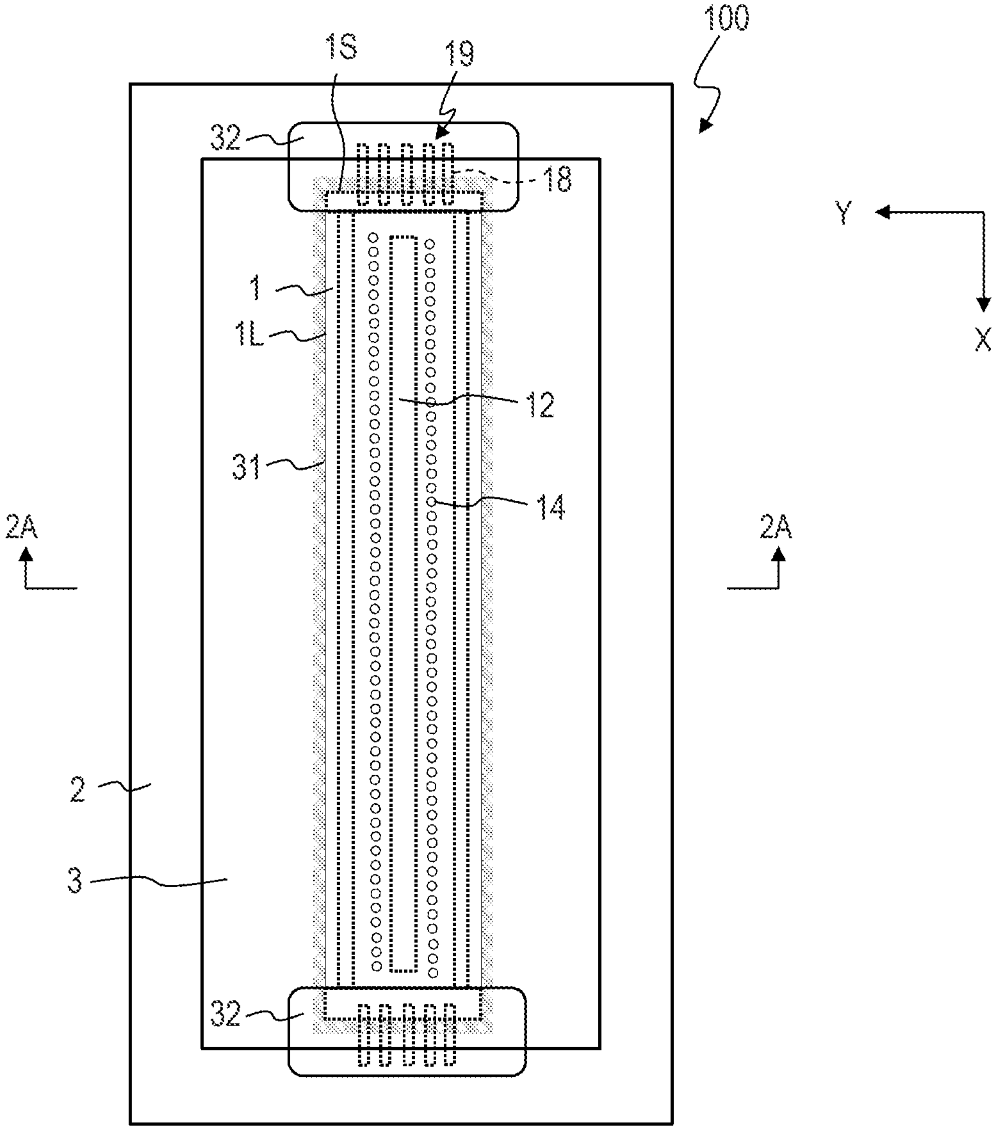
FIG. 2A is a plan view of the liquid ejection head shown in FIG. 1.
Figure 2B:
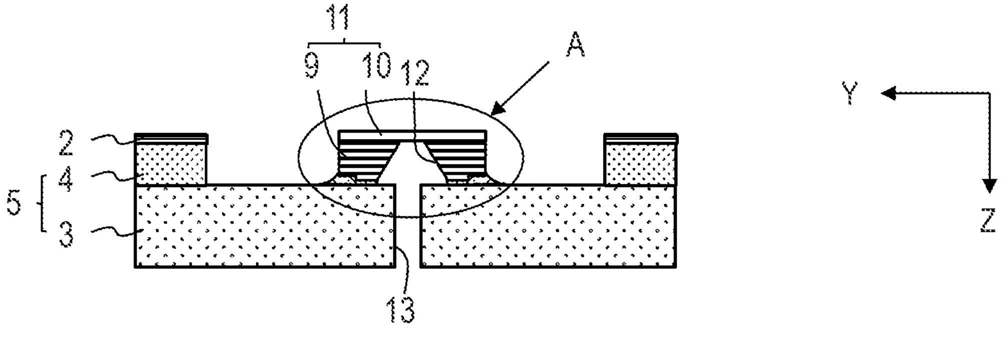
FIG. 2B is a cross-sectional view taken in 2A-2A in FIG. 2A.
Figure 3:
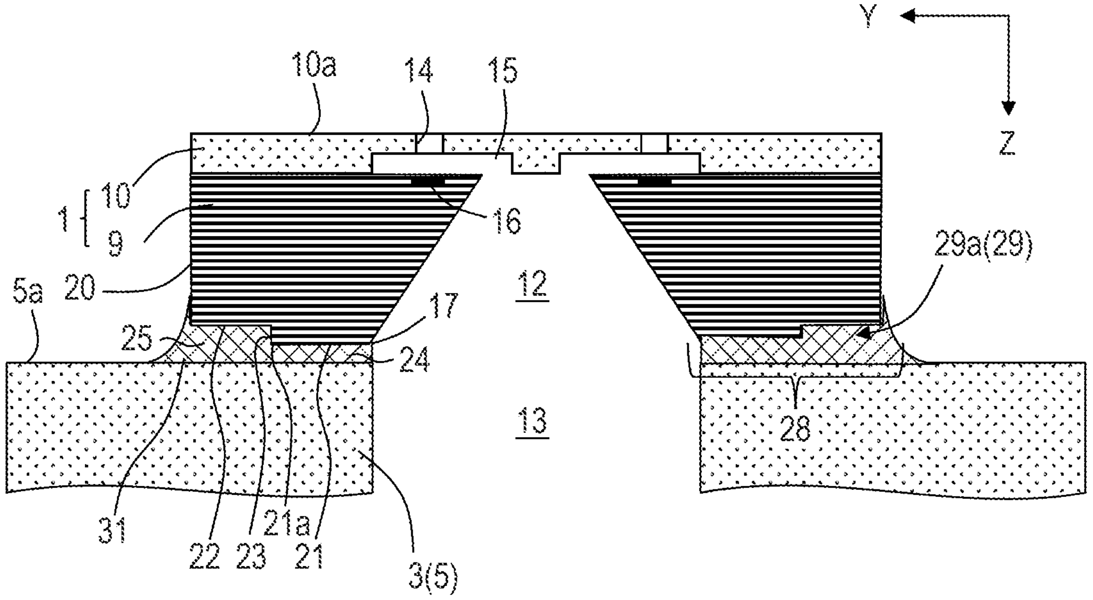
FIG. 3 is an enlarged cross-sectional view of the liquid ejection head shown in FIG. 1.

FIG. 1 is an exploded perspective view of a liquid ejection head 100 according to the first embodiment. FIG. 2A is a plane view of the liquid ejection head 100 as seen from a print element substrate, and FIG. 2B is a cross-sectional view of the print element substrate 1 and a support member 5 along the line 2A-2A in FIG. 2A. FIG. 3 is an enlarged view of part A of FIG. 2B. The liquid ejection head 100 includes a print element substrate 1 (first print element substrate), a support member 5 for supporting the print element substrate 1, and an electric wire member 2 electrically connected to the print element substrate 1. The print element substrate 1 has a rectangular shape having a pair of long sides 1L parallel to each other and a pair of short sides 1S parallel to each other when viewed in the Z direction, that is, the direction orthogonal to the ejection port formed surface 10*a*. An adhesive agent 31 is provided between the print element substrate 1 and the support member 5, and the print element substrate 1 is adhered to the support member 5 by the adhesive agent 31. The adhesive agent 31 has excellent fluidity and a constant hardness after curing. Thus, the adhesive agent 31 can be uniformly applied to a wide adhering surface of the print element substrate 1, and the accuracy of the adhering position of the print element substrate 1 can be easily secured.

The print element substrate 1 has a substrate 9 and an ejection port formed member 10. An ejection port 14 for ejecting a liquid and a pressure chamber 15 for temporarily holding the liquid ejected from the ejection port 14 are formed in the ejection port formed member 10. The ejection port 14 is disposed on an ejection port formed surface 10*a* which is a surface of the ejection port formed member 10 opposed to the support member 5. A large number of ejection ports 14 are arranged in parallel with the long side 1L of the print element substrate 1. The substrate 9 is provided with an energy generating element 16 for generating energy for ejecting liquid. The energy generating element 16 is a thermoelectric conversion element, but may be another type of element such as a piezoelectric element. A supply portion 12 for the liquid, which is a flow path for supplying liquid to the pressure chamber 15, is formed on the substrate 9. In order to evenly supply the liquid to the respective ejection ports 14, the supply portion 12 is formed as a cavity having an elongated shape in the longitudinal direction of the print element substrate 1. The supply portion 12 has a rectangular opening opposed to the support member 5. This opening forms a liquid a supply port 17.

The support member 5 has a support plate 3 and a frame member 4 connected to the support plate 3. A liquid supply passage 13 communicating with the supply portion 12 is formed in the support plate 3. The frame member 4 surrounds the print element substrate 1. The support plate 3 and the frame member 4 are connected to form a support member 5 having a recess, and the print element substrate 1 is adhered to the support plate 3 which is the bottom surface of the recess. The support member 5 is connected to the sub tank 6. The sub tank 6 has a liquid a supply port 7. The liquid is supplied from the main tank (not shown) through the liquid a supply port 7 to the sub tank 6, and is supplied from the sub tank 6 to the support member 5.

The electric wire member 2 is an electric wiring tape for sending an electric signal to the print element substrate 1. The electric wire member 2 is adhered to the frame member 4 with an adhesive agent (not shown). The electric wire member 2 is connected to an electric wire board 8, and the electric wire board 8 receives an electric signal from a main body (not shown) of a liquid ejection apparatus. An electric connection portion 19 is formed by connecting an electric connection pad 30 (see FIG. 5) of the print element substrate 1 to the electrical wire member 2 by a lead 18. That is, the electric connection portion 19 is composed of an electric connection pad 30 of the print element substrate 1 and a lead 18. The electric connection portion 19 is provided along a short side 1S (only) on both sides of the print element substrate 1.

The electric connection portion 19 is covered or sealed by a first seal material 32. The first seal material 32 is also filled below the lead 18, i.e., in a space formed by the bottom surface of the support plate 3, the side surface of the frame member 4, the outer wall 20 of the print element substrate 1, and the lead 18. Since the first seal material 32 is required to be cured while maintaining a certain thickness, it is preferable that the first seal material has a low fluidity. Since the first seal material 32 comes into contact with a recovery unit (not shown) during use of a liquid ejection apparatus, it is preferable that the first seal material has both hardness and durability. The movement of the print element substrate 1 in the X direction is limited by the first seal material 32. The first seal material 32 spreads to the long side 1L of the print element substrate 1 by capillary force and adheres to the outer wall 20 of the print element substrate 1. However, since the amount of the first seal material 32 is limited, the portion of the long side 1L of the print element substrate 1 that is close to the short side 15 is covered with the first seal material 32, but the central portion thereof is not covered with the first seal material 32. Therefore, the movement of the print element substrate 1 in the Y direction is not greatly limited.

Figure 4:
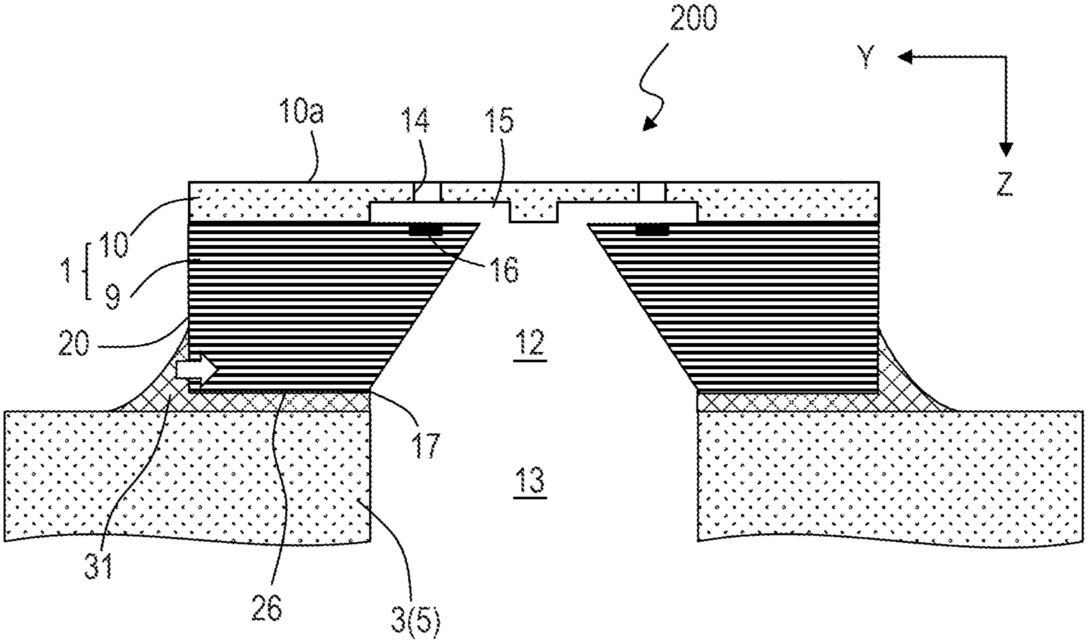
FIG. 4 is an enlarged cross-sectional view of the liquid ejection head of comparative example 1.

The liquid ejection head 200 of the comparative example will now be described. FIG. 4 is a cross-sectional view of the liquid ejection head 200 of the comparative example similar to the cross-sectional view in FIG. 3. The print element substrate 1 of the liquid ejection head 200 of the comparative example has a liquid a supply port 17 opposed to the support member 5 and communicating with the ejection port 14, and an adhered surface 26 opposed to the support member 5 and surrounding the supply port 17. An adhesive agent 31 is provided between the adhered surface 26 and the support member 5, and the print element substrate 1 is adhered to the support member 5. The adhered surface 26 is a frame-shaped plane extending from the supply portion 12 of the print element substrate 1 to an outer wall 20. Specifically, the adhesive agent 31 is applied or transferred to the support plate 3 in a predetermined pattern, the adhered surface 26 of the print element substrate 1 is positioned relative to the adhesive agent 31, and the adhered surface 26 of the print element substrate 1 presses the adhesive agent 31. Thereafter, the adhesive agent 31 is cured at a high temperature to adhere the print element substrate 1 to the support member 5. When pressed, the adhesive agent 31 protrudes into the supply portion 12 and the outer wall 20. The adhesive agent 31 protruding into the outer wall 20 forms a meniscus in a corner part formed by the support plate 3 and the print element substrate 1, and spreads and hardens along the periphery of the print element substrate 1.

Figure 5:
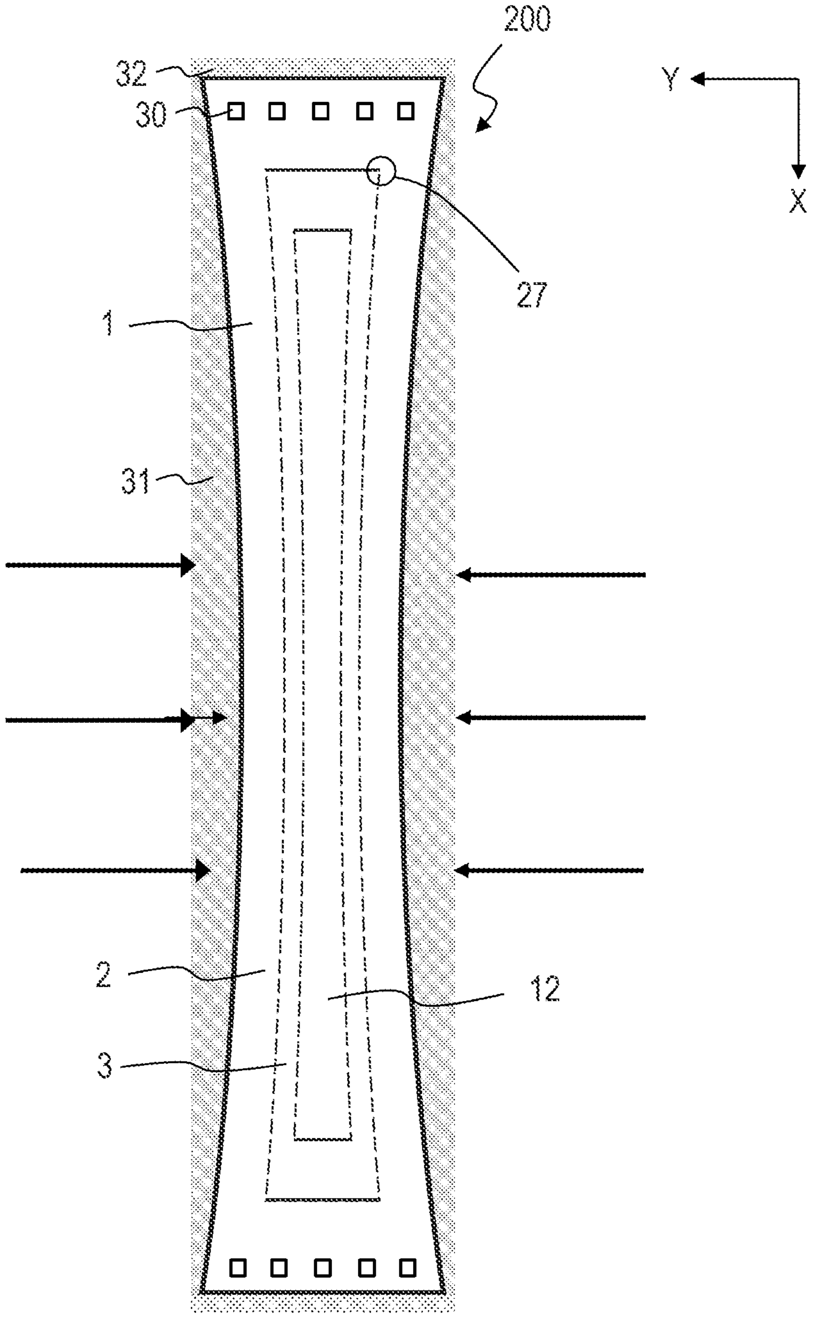
FIG. 5 is a schematic view showing a deformation of the print element substrate of comparative example 1.

When printing is performed with the liquid ejection head 200 thus prepared, the adhesive agent 31 spread along the long side 1L of the print element substrate 1 absorbs ink, expands, and pushes the print element substrate 1 in the short direction (Y direction) (as designated by an arrow in FIG. 4). When the amount of protrusion of the adhesive agent 31 to the outer wall 20 is large, the adhesive agent 31 expands the outer wall 20 of the print element substrate 1 in the Z direction. As a result, the area pushed by the adhesive agent 31 on the outer wall 20 of the print element substrate 1 increases. As a result, the print element substrate 1 is pushed inwardly, and the supply portion 12 is deformed. FIG. 5 is a schematic plane view showing a state of deformation when the print element substrate 1 is damaged.

Stress is generated in the corner portion 27 of the supply portion 12, and the print element substrate 1 is cracked and broken with the corner portion 27 as a starting point. Also, the force for pushing up the print element substrate 1 in the Z direction is increased. The pushing force in the Z direction is also less affected than the pushing force in the Y direction, but leads to deformation and breakage of the print element substrate 1. In particular, the print element substrate 1 having a large aspect ratio (the ratio of the dimension of the long side 1L to the dimension of the short side 1S) and having a supply portion 12 having a shape corresponding to the aspect ratio deforms greatly to a load applied from the long side 1L in the Y direction.

In contrast, with reference to FIG. 3, in the present embodiment, the print element substrate 1 has the liquid the supply port 17 that is opposed to the support member 5 and communicates with the ejection port 14, and a first surface 21 that is opposed to the support member 5 and surrounds the supply port 17, a second surface 22, and a third surface 23. The second surface 22 is opposed to the support member 5 and is retracted from the first surface 21 relative to the support member 5. The third surface 23 connects the first surface 21 and the second surface 22. In other words, the print element substrate 1 has the supply port 17 that is opposed to the support member 5 and communicates with the ejection port 14, an opposed portion 28 that is opposed to the support member 5 and surrounds the supply port 17, an outer wall 20, and a defective portion 29 that is formed over the opposed portion 28 and the outer wall 20. The defective portion 29 is a step 29*a*. The first surface 21 and the second surface 22 are parallel to each other, and the third surface 23 intersects the first surface 21 and the second surface 22. Preferably, the third surface 23 is orthogonal to the first surface 21 and the second surface 22. As a result, the third surface 23 becomes a surface extending in the Z direction, so that formation is facilitated. The adhesive agent 31 is filled in a first space 24 between the first surface 21 and the support member 5, and at least a part of a second space 25 between the second surface 22 and the support member 5. In other words, the adhesive agent 31 is filled in the first space 24 between the first surface 21 and the support member 5, and is also filled in at least a part of the defective portion 29. In the present embodiment, the adhesive agent 31 covers the entire surfaces of the second surface 22 and the third surface 23, fills the second space 25, and partially protrudes outside the outer wall 20 of the print element substrate 1.

In this embodiment, the first surface 21, the second surface 22, and the third surface 23 are planar, but for example, the second surface 22 and the third surface 23 may be curved. If the second surface 22 is retracted from the first surface 21 with respect to the support member 5, the shapes of the second surface 22 and the third surface 23 or the shape of the second space 25 are not limited at all. "Retracted" in the present disclosure means that the average separation distance in the Z direction between the opposing surface 5*a* of the support member 5 and the second surface 22 of the print element substrate 1 is larger than that between the opposing surface 5*a* of the support member 5 and the first surface 21 of the print element substrate 1, and in an extreme case, a part of the second surface 22 may protrude toward the opposing surface 5*a* of the support member 5 from the print element substrate 1. A plurality of second surfaces 22 and a plurality of third surfaces 23 may be provided as a stepped form.

The second surface 22 or the step 29*a* is provided along the long side 1L (only) of the print element substrate 1. The second surface 22 is not provided on the short side 15 of the print element substrate 1. This is because the short side 15 of the print element substrate 1 is short, and the force for pushing the print element substrate 1 in the X direction from the short side 15 is small and negligible. In addition, in consideration of the stability of the connection (bonding) of the electric connection portion 19, the necessity of providing the second surface 22 is small. However, depending on the aspect ratio of the print element substrate 1, the second surface 22 may be provided along the short side 15 of the print element substrate 1. The second surface 22 is preferably provided along the entire length of the long side 1L of the print element substrate 1, but may be provided only at the center region of the long side 1L, for example. As shown in FIG. 5, since the center region of the long side 1L has the largest deformation, it is effective to provide the second surface 22 only at the center region of the long side 1L. That is, the second surface 22 may be provided along at least a part of the outer edge portion 21*a* of the first surface 21.

At the time of pressing for adhering, the adhesive agent 31 protrudes to the supply portion 12 and protrudes from the outer wall 20 of the print element substrate 1, but a part of the adhesive agent 31 is housed in the second space 25. As shown in FIG. 3, the adhesive agent 31 protruding from the outer wall 20 forms a meniscus between the support plate 3, the print element substrate 1 and the second space 25. Although a part of the adhesive agent 31 goes up the outer wall 20, since a part of the adhesive agent 31 is housed in the second space 25, the amount of the adhesive agent 31 protruding from the outer wall 20 is reduced. That is, the height of the protruding adhesive agent 31 in the Z direction is lower than that of the comparative example. Therefore, the region in which the adhesive agent 31, which has absorbed ink and swelled, pushes the print element substrate 1 in the Y direction becomes small, and the force of the adhesive agent 31 pushing the outer wall 20 of the print element substrate 1 in the Y direction becomes small. Even if the amount of the adhesive agent 31 protruding from the outer wall 20 in the Y direction is reduced, the pushing force of the outer wall 20 of the print element substrate 1 is reduced. As a result, the possibility of breakage of the print element substrate 1 is suppressed. The adhesive agent 31 accommodated in the second space 25 does not have a large influence on the print element substrate 1.

Since the adhesive agent 31 is in contact with the print element substrate 1 on the first surface 21, the second surface 22, and the third surface 23, the contact area between the adhesive agent 31 and the print element substrate 1 increases. An anchoring effect caused by the increment of the contact area increases the adhering force between the print element substrate 1 and the support member 5, and the print element substrate 1 is firmly fixed by the support member 5. Furthermore, a portion for holding the adhesive agent 31 protruding between the outer wall 20 of the print element substrate 1 and the frame member 4 is also unnecessary. As described above, the present embodiment is effective not only in reducing the possibility of damage to the print element substrate 1, but also in improving the adhering reliability between the print element substrate 1 and the support member 5 and in miniaturizing the liquid ejection head.

When printing was performed by the liquid ejection head 100 of the first embodiment, no damage was observed in the print element substrate 1 after applying $4.0\times10^{8}$ pulses per ejection port 14. On the other hand, when printing was performed by the liquid ejection head 200 using the print element substrate of the comparative example, after application of $0.7\times10^8$ pulses per ejection port 14, a crack originating from the corner portion 27 of the supply portion 12 was confirmed in the print element substrate 1.

Second Embodiment

Figure 6A:
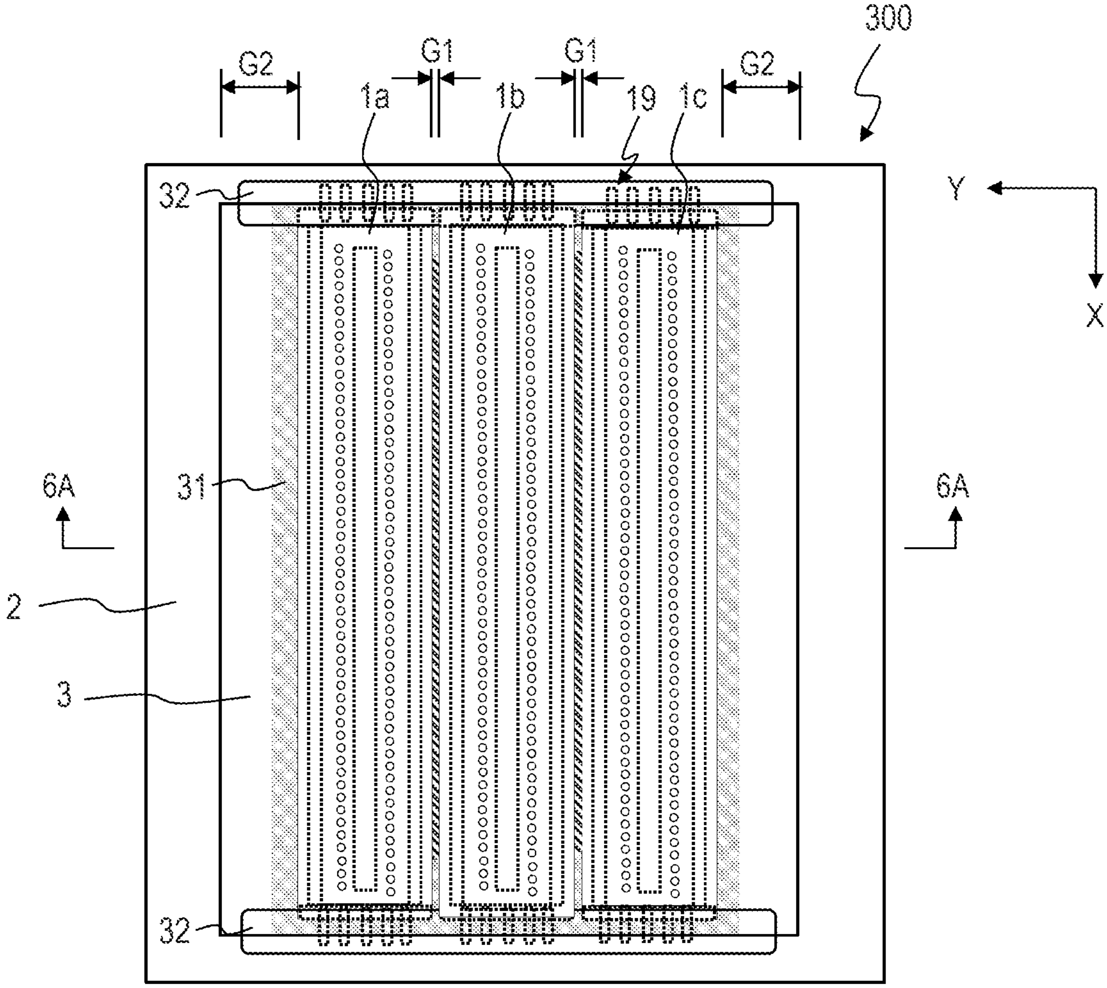
FIG. 6A is a plan view of the liquid ejection head according to the second embodiment.
Figure 6B:
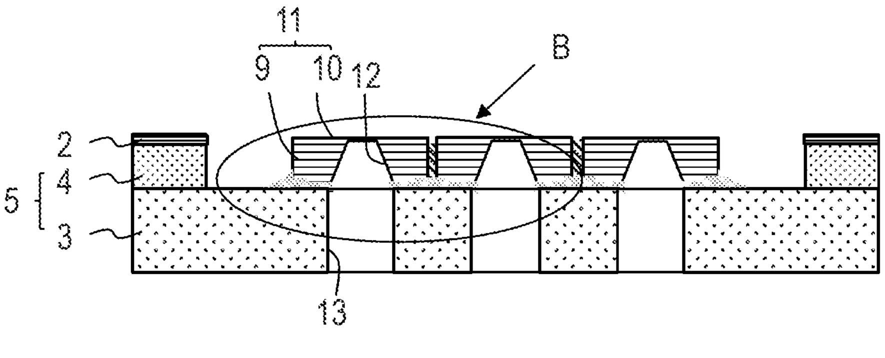
FIG. 6B is a cross-sectional view taken along the line 6A-6A in FIG. 6A.
Figure 7A:
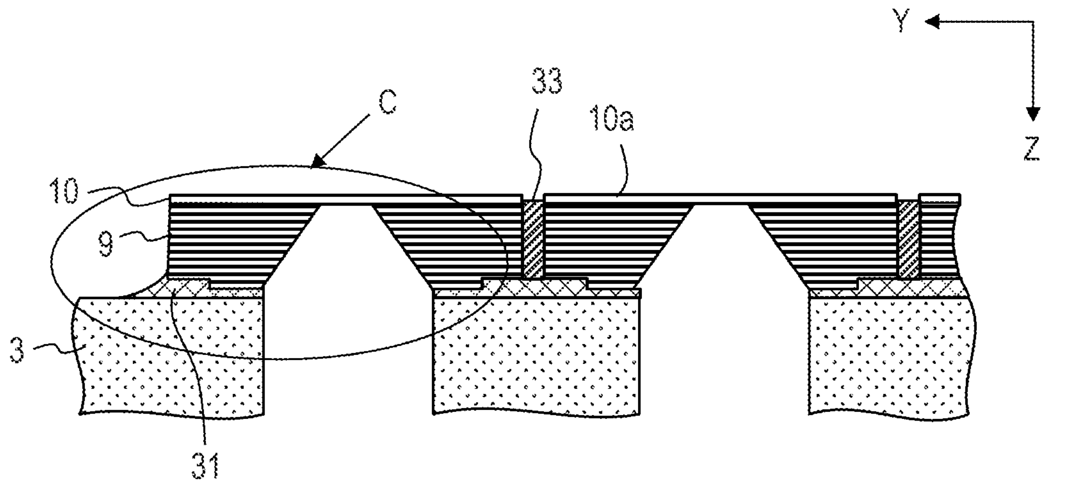
FIG. 7A is an enlarged cross-sectional view of the liquid ejection head shown in FIG. 6B.
Figure 7B:
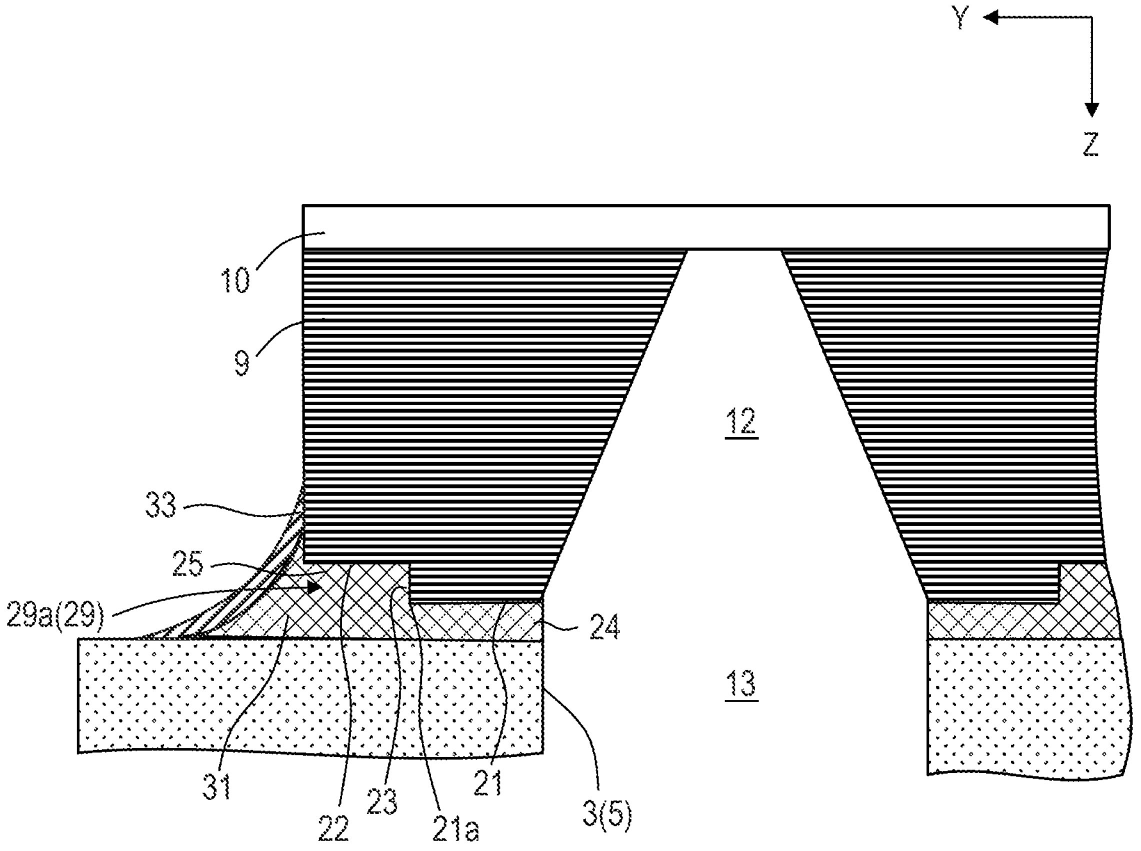
FIG. 7B is an enlarged cross-sectional view of the liquid ejection head shown in FIG. 7A.

In this embodiment, a plurality of print element substrates 1*a*, 1*b*, 1*c* are provided, and the configuration of the seal material is changed from that of the first embodiment accordingly. The configuration and the effects, which are not described, are the same as those of the first embodiment. FIG. 6A is a plane view of the liquid ejection head 300 as seen from the print element substrates 1*a*, 1*b*, 1*c* of the liquid ejection head 300 according to the second embodiment, and FIG. 6B is a cross-sectional view of the first to third print element substrates 1*a*, 1*b*, 1*c* and the support member 5 along the line 6A-6A in FIG. 6A. FIG. 7A is an enlarged view of the B portion of FIG. 6B, and FIG. 7B is an enlarged view of the C portion of FIG. 7A.

The liquid ejection head 300 includes a first print element substrate 1*a*, a second print element substrate 1*b*, and a third print element substrate 1*c*. The first to third print element substrates 1*a*, 1*b*, 1*c* are adjacent to each other and supported by a common support member 5. The first to third print element substrates 1*a*, 1*b*, 1*c* eject different liquids (for example, inks of different colors), and their configurations are the same as that of the print element substrate 1 of the first embodiment. The frame member 4 surrounds the first to third print element substrates 1*a*, 1*b*, 1*c*. A gap G1 between the first print element substrate 1*a* and the second print element substrate 1*b* is smaller than a gap G2 between the first print element substrate 1*a* and the frame member 4 and a gap G2 between the third print element substrate 1*c* and the frame member 4. A gap G1 between the second print element substrate 1*b* and the third print element substrate 1*c* is smaller than a gap G2 between the first print element substrate 1*a* and the frame member 4 and a gap G2 between the third print element substrate 1*c* and the frame member 4. Thus, the liquid ejection head 100 can be miniaturized.

In the first embodiment, the seal material that is filled under the lead 18 and the seal material that seals the electric connection portion 19 are the same. In contrast, in the second embodiment, a small gap G1 is provided between the first print element substrate 1*a* and the second print element substrate 1*b* and between the second print element substrate 1*b* and the third print element substrate 1*c*. The gap G1 must be filled for the purpose of sealing stability of the electric connection portion 19. Therefore, a second seal material 33 having a higher fluidity than the first seal material 32 is filled in the gap G1 between the first print element substrate 1*a* and the second print element substrate 1*b* and between the second print element substrate 1*b* and the third print element substrate 1*c*. The second seal material 33 fills the gap G1 by capillary force and fills the gap to the vicinity of the ejection port formed surface 10*a*. Even after curing, the second seal material 33 has flexibility for relieving stress generated in the gap G1 due to dimensional changes in the first to third print element substrates 1*a*, 1*b*, 1*c*. The second seal material 33 spreads around the print element substrates 1*a*, 1*b*, 1*c* by capillary force generated between the adhesive agent 31 and the first to third print element substrates 1*a*, 1*b*, 1*c*, and between the adhesive agent 31 and the support plate 3, and the adhesive agent 31 is covered with the second seal material 33. Thereafter, the first seal material 32 is applied along the short side 1S of each of the print element substrates 1*a*, 1*b*, 1*c* to seal the electric connection portion 19. The first seal material 32 covers a part of the upper surface of the second seal material 33. Since the gap G2 between the first print element substrate 1*a* and the frame member 4, and between the third print element substrate 1*c* and the frame member 4 is larger than the gap G1, the first seal material 32 does not come up to the ejection port formed surface 10*a*.

As described above, when a plurality of print element substrates 1*a*, 1*b*, 1*c* are arranged adjacently, especially when three or more print element substrates 1*a*, 1*b*, 1*c* are arranged, the outer wall 20 of the outermost print element substrates 1*a*, 1*c* opposed to the frame member 4 is pressed by the adhesive agent 31 and the second seal material 33. The pressed region tends to be larger than in a case of the first embodiment, and the stress of the print element substrate 1 is complicated. Also in this embodiment, the first to third print element substrates 1*a*, 1*b*, 1*c* include a liquid supply port 17 that is opposed to the support member 5 and communicates with the ejection port 14, a first surface 21 that is opposed to the support member 5 and surrounds a supply port 17, a second surface 22 and a third surface 23. The second surface 22 is opposed to the support member 5, is provided along at least a part of the outer edge portion 21*a* of the first surface 21, and is retracted from the first surface 21 with respect to the support member 5. Accordingly, a part of the adhesive agent 31 is housed in the second space 25, and the amount of the adhesive agent 31 protruding from the outer wall 20 is reduced. Thereby, the width of the adhesive agent 31 covering the outer wall 20 (height in the Z direction) is suppressed, and the total width of the adhesive agent 31 and the second seal material 33 covering the outer wall 20 (height in the Z direction) is also suppressed. As a result, the force of the adhesive agent 31 and the second seal material 33, which have absorbed the ink and swelled, to press the outer wall 20 of the print element substrate 1 is reduced. According to the present embodiment, in the liquid ejection head in which a plurality of print element substrates are arranged, there is an effect of reducing the possibility of breakage of the print element substrates. This embodiment is also effective in improving the adhering reliability between the print element substrates 1*a*, 1*b*, 1*c* and the support member 5 and in miniaturizing the liquid ejection head.

When printing was performed by the liquid ejection head 300 of the second embodiment, no damage was observed in the print element substrate 1 after applying $4.0\times10^8$ pulses per ejection port 14. On the other hand, when printing was performed by the liquid ejection head using the print element substrate 1 without the step 29*a* in the second embodiment, after application of $0.6\times10^8$ pulses per ejection port 14, a crack originating from the corner portion 27 of the supply portion 12 was confirmed in the print element substrate 1.

Third Embodiment

Figure 8:
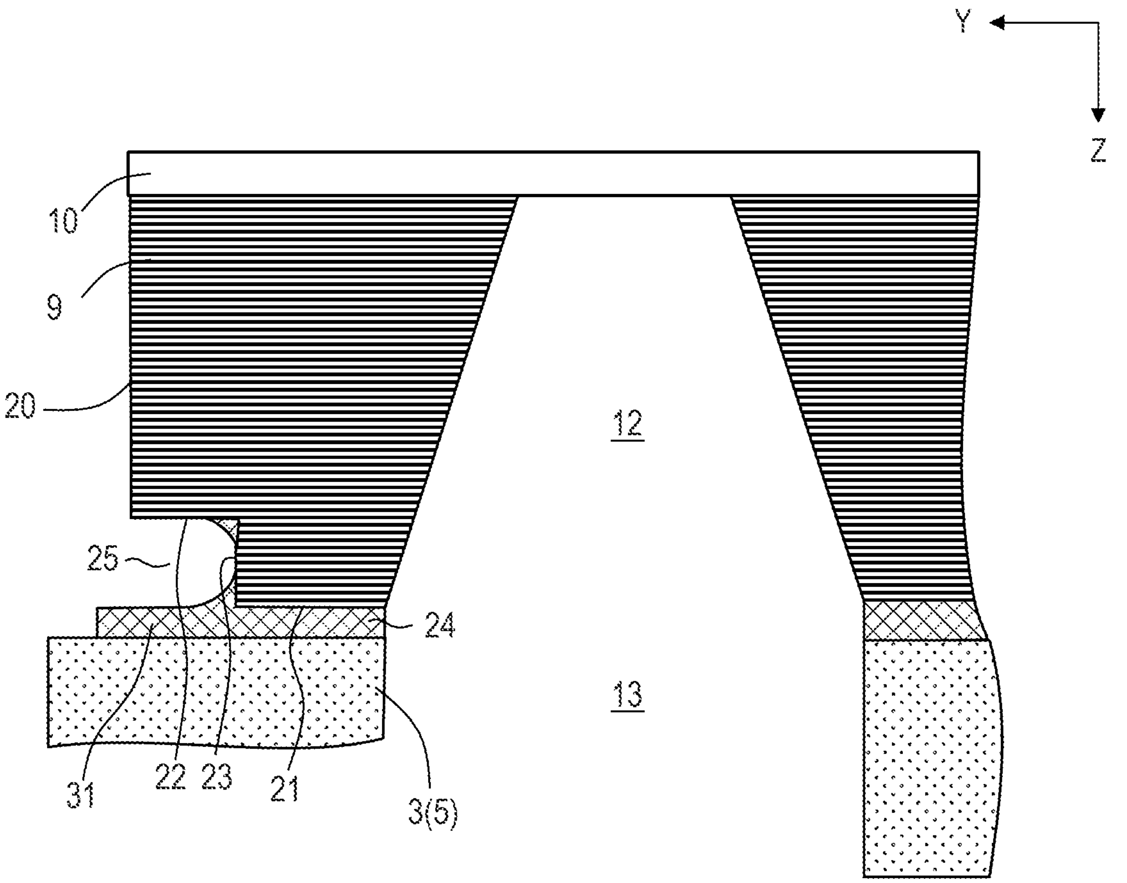
FIG. 8 is an enlarged cross-sectional view of the liquid ejection head according to the third embodiment.

FIG. 8 is an enlarged cross-sectional view of a liquid ejection head 100 according to a third embodiment of the present disclosure. Here, the differences from the first and second embodiments will be mainly described. In the first and second embodiments, the entire area of the second space 25 is filled with the adhesive agent 31, and the adhesive agent 31 also protrudes from the outer wall 20 of the print element substrate 1, but in the present embodiment, the adhesive agent 31 is filled only in a part of the second space 25. While the adhesive agent 31 covers the entire surface of the third surface 23, only at least a part of the second surface 22 may be covered thereby.

Figure 9:
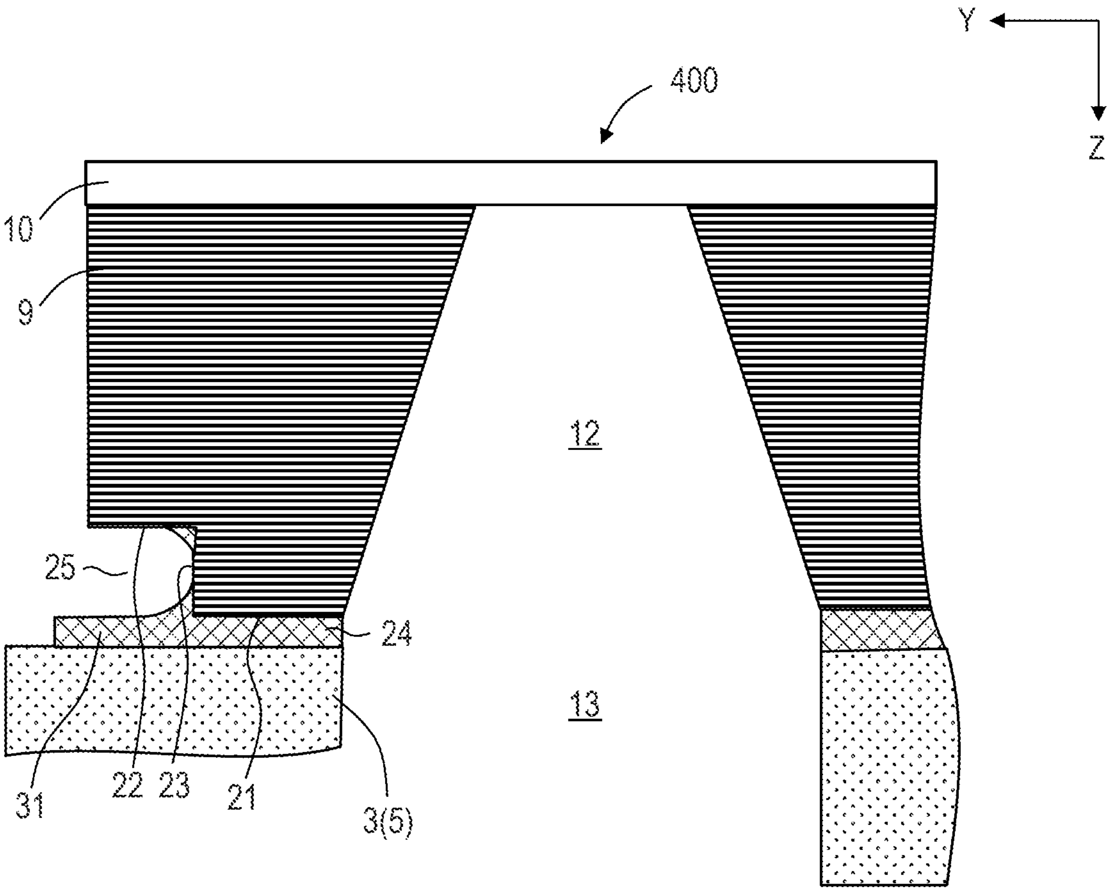
FIG. 9 is an enlarged cross-sectional view of the liquid ejection head of comparative example 2.

FIG. 9 shows the liquid ejection head 400 of comparative example 2. Since the height difference (the height of the step 29*a*) between the first surface 21 and the second surface 22 is large and the adhesive agent 31 is less, the adhesive agent 31 adheres only to a part of the third surface 23 and does not reach the second surface 22. In this case, the stress applied to the print element substrate 1 is the same as in the case where there is no step 29*a*. In the present embodiment, as shown in FIG. 8, since the adhesive agent 31 adheres to the second surface 22 by capillary force generated at the corners formed by the second surface 22 and the third surface 23, the amount of protrusion of the adhesive agent 31 can be reduced.

Fourth Embodiment

Figure 10:
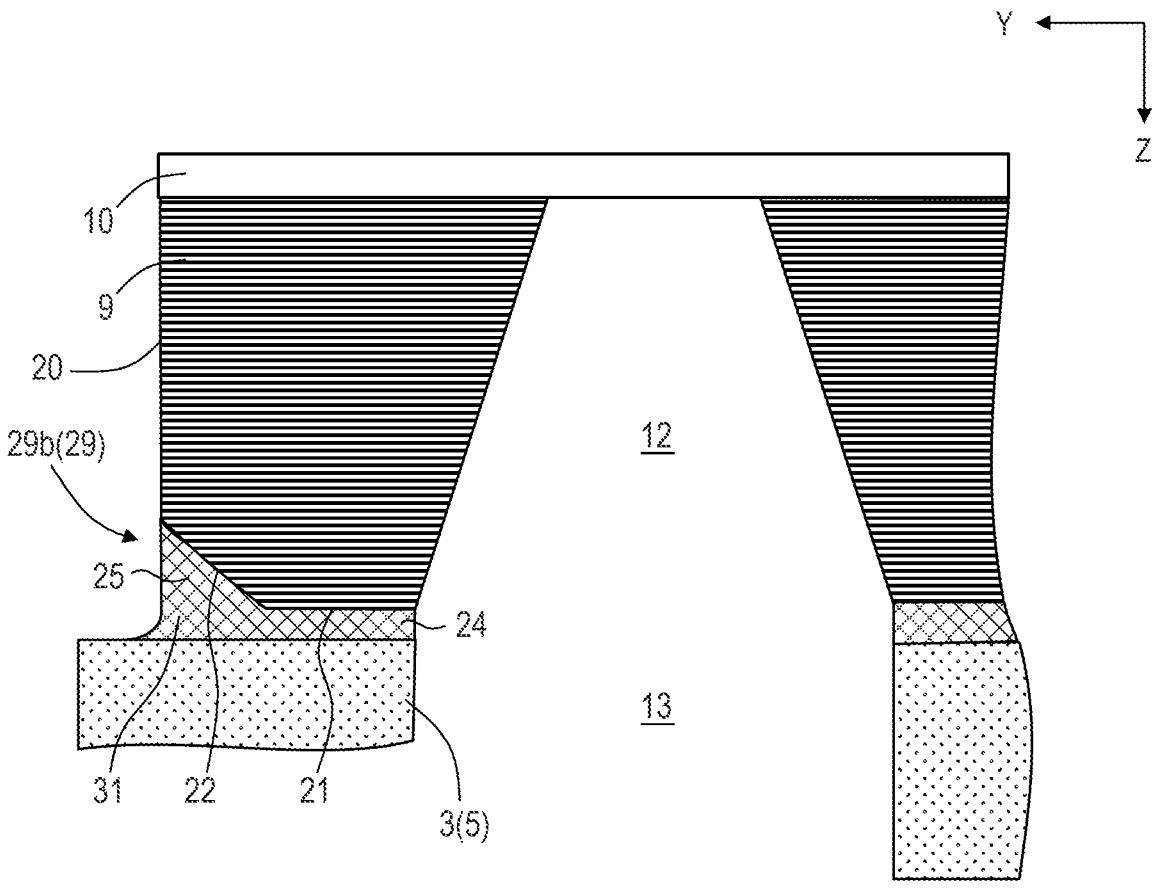
FIG. 10 is an enlarged cross-sectional view of the liquid ejection head according to the fourth embodiment.

FIG. 10 is an enlarged cross-sectional view of a liquid ejection head 100 according to a fourth embodiment of the present disclosure. In this embodiment, the chamfer 29*b* is used instead of the step 29*a*. That is, the defective portion 29 is a chamfer 29*b*. The second surface 22 is connected to the first surface 21 and is inclined with respect to the first surface 21. The second surface 22 is planar. The adhesive agent 31 fills the second space 25 and protrudes outside the outer wall 20 of the print element substrate 1. Although not shown, as in the third embodiment, the adhesive agent 31 may be filled only in a part of the second space 25. Although the storage volume of the adhesive agent 31 is reduced as compared with the case of the step 29*a*, the same effects as those of the first to third embodiments can be obtained in this embodiment. In particular, when the print element substrate 1 is made of silicon, the chamfer 29*b* can be formed by anisotropic etching as in the case of the supply portion 12.

Modified Example

Figure 11A:
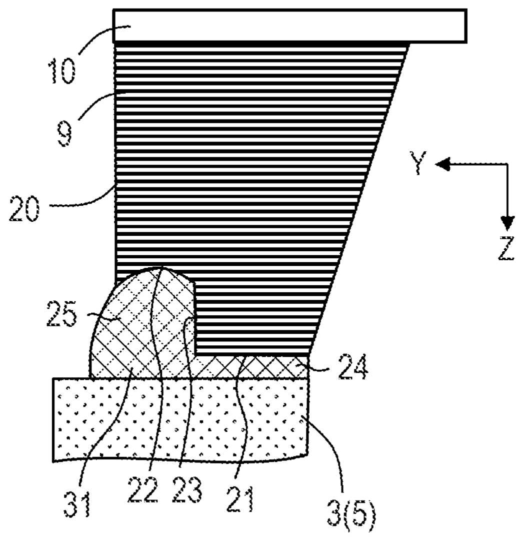
FIGS. 11A, 11B, 11C and 11D are enlarged cross-sectional views of the liquid ejection head of each modification.
Figure 11B:
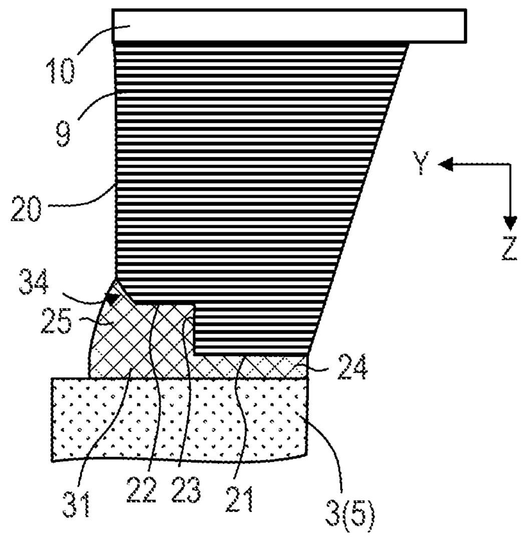
Figure 11C:
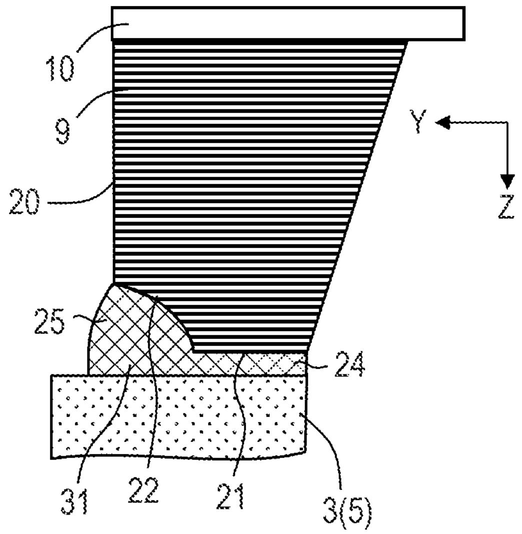
Figure 11D:
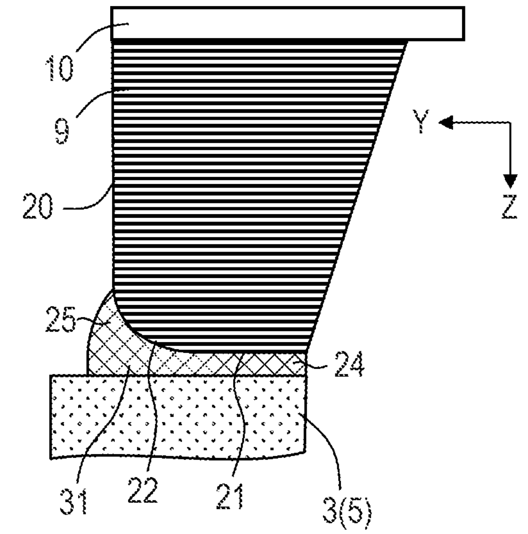

The present disclosure is not limited to the above described embodiments, and various modifications are possible. Referring to FIG. 11A, the second surface 22 is a concave surface retracted with respect to the support member 5. The second surface 22 is a curved surface in the figure, but may be formed by connecting a plurality of planes. According to this modification, more adhesive agent 31 can be accommodated. Referring to FIG. 11B, an intersection of the second surface 22 and the outer wall 20 is chamfered (designated by reference numeral 34). This variation can also accommodate more adhesive agent 31. Referring to FIG. 11C, the second surface 22 is a concave surface retracted with respect to the support member 5. According to this modification, more adhesive agent can be accommodated than in the fourth embodiment. Referring to FIG. 11D, the second surface 22 is a convex surface projecting toward the support member 5. As a result, since the outer wall 20 and the second surface 22 are formed of a smooth surface and have no edge, cracks originating from the edge are hardly generated.

(Manufacturing Method of Liquid Ejecting Head 100)

Next, a method of manufacturing the liquid ejection head 100 will be described with reference to the first embodiment. First, the print element substrate 1 provided with the energy generating element 16, the ejection port formed member 10, and the like is formed. The second surface 22 of the print element substrate 1 is formed by chemical polishing with masking the first surface 21 of the adhered part adhered with the support member 5. The second surface 22 can also be formed by laser dicing. Further, the blade dicing may be inserted from the back surface of the wafer on which the print element substrate 1 is formed (the surface on which the print element substrate 1 is not formed) to collectively form the steps 29*a* of the print element substrate 1 adjacent to each other. Thereafter, the boundaries of the print element substrates 1 adjacent to each other are cut with a thin blade, and the respective print element substrates 1 are cut out from the wafer.

Next, an adhesive agent 31 is provided at a portion of the support member 5 to which the print element substrate 1 is adhered, and the print element substrate 1 is positioned relative to the support member 5. The adhesive agent 31 is applied or transferred to the support plate 3 with a predetermined pattern. The print element substrate 1 is positioned with respect to the support member 5 such that the supply port 17, the first surface 21, and the second surface 22 are opposed to the support member 5, the second surface 22 is retracted from the first surface 21 with respect to the support member 5, and the first surface 21 is opposed to an adhesive agent 31. Next, the print element substrate 1 is adhered to the support member 5 with the adhesive agent 31. When the print element substrate 1 is pushed toward the support member 5, the adhesive agent 31 is filled in the first space 24 between the first surface 21 and the support member 5 and at least a part of the second space 25 between the second surface 22 and the support member 5.

Next, an adhesive agent is applied to the surface of the frame member 4 to which the electric wire member 2 is connected, and the electric wire member 2 is stuck to a predetermined position of the frame member 4. Next, an electric connection portion 19 between the print element substrate 1 and the electric wire member 2 is formed by bonding. Next, the first seal material 32 is applied to the periphery of the print element substrate 1 by a dispenser, and filled in the space between the print element substrate 1 and the support member 5 while sufficiently flowing. Further, the first seal material 32 is applied to the electric connection portion 19 (the electric connection pad 30 of the print element substrate 1 and the lead 18 of the electric wire substrate 8). Thereafter, the adhesive agent 31 and the first seal material 32 are heated and cured together.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-099618, filed Jun. 15, 2021, which is hereby incorporated by reference herein in its entirety.

What is claimed is:

1. A liquid ejection head comprising:

a print element substrate having an ejection port for ejecting a liquid and having a rectangular shape;

a support member configured to support the print element substrate; and an adhesive agent provided between the print element substrate and the support member for adhering the print element substrate to the support member, wherein the print element substrate includes a supply port opposed to the support member and communicating with the ejection port and having an elongated shape in the longitudinal direction of the print element substrate, a first surface opposed to the support member and surrounding the supply port, and a second surface opposed to the support member, provided along at least a part of an outer wall of the print element substrate and along a long side of the rectangular shape, and retracted from the first surface relative to the support member, and wherein the adhesive agent is filled in a first space between the first surface and the support member, and at least a part of a second space between the second surface and the support member.

2. The liquid ejection head according to claim 1, wherein the print element substrate has a third surface connecting the first surface and the second surface.

3. The liquid ejection head according to claim 2, wherein the first surface and the second surface are parallel to each other and the third surface intersects the first surface and the second surface.

4. The liquid ejection head according to claim 2, wherein the second surface is a concave surface that is retracted with respect to the support member.

5. The liquid ejection head according to claim 2, wherein an intersection of the second surface and the outer wall of the print element substrate is chamfered.

6. The liquid ejection head according to claim 2, wherein the adhesive agent covers an entire surface of the third surface and at least a part of the second surface.

7. The liquid ejection head according to claim 1, wherein the second surface is connected to the first surface and is inclined with respect to the first surface.

8. The liquid ejection head according to claim 7, wherein the second surface is planar.

9. The liquid ejection head according to claim 7, wherein the second surface is a concave surface retracting with respect to the support member or a convex surface projecting toward the support member.

10. The liquid ejection head according to claim 1, wherein the adhesive agent is filled in only the part of the second space.

11. The liquid ejection head according to claim 1, wherein the adhesive agent fills in the second space and protrudes outside an outer wall of the first print element substrate.

12. The liquid ejection head according to claim 1, further comprising an electric wire member electrically connected to the print element substrate, wherein an electric connection portion between the print element substrate and the electric wire member is provided along a short side of the rectangular shape.

13. The liquid ejection head according to claim 12, further comprising a first seal material to seal the electric connection portion.

14. The liquid ejection head according to claim 13, wherein the print element substrate is provided in plural and comprises a first print element substrate and a second print element substrate adjacent to the first print element substrate, each of the first print element substrate and the second print element substrate being supported by the support member and having an ejection port for ejecting a liquid, the support member includes a frame member surrounding the first print element substrate and the second print element substrate, a gap between the first print element substrate and the second print element substrate is shorter than a gap between the first print element substrate and the frame member, and a second seal material having higher fluidity than that of the first seal material is filled between the first print element substrate and the second print element substrate.

15. The liquid ejection head according to claim 14, wherein the second seal material covers the adhesive agent.

16. A liquid ejection head comprising:

a print element substrate having an ejection port for ejecting a liquid;

a support member configured to support the print element substrate; and an adhesive agent provided between the print element substrate and the support member for adhering the print element substrate to the support member, wherein the print element substrate includes a supply port opposed to the support member and communicating with the ejection port, an opposed portion opposed to the support member and surrounding the supply port, an outer wall, and a defective portion formed over the opposed portion and the outer wall, and wherein the adhesive agent is filled in a first space between the opposed portion and the support member, and at least a part of the defective portion.

17. The liquid ejection head according to claim 16, wherein the defective portion is a step.

18. The liquid ejection head according to claim 16, wherein the defective portion is a chamfer.

19. A method for manufacturing a liquid ejection head comprising: a print element substrate having an ejection port for ejecting a liquid and having a rectangular shape, and a support member configured to support the print element substrate, the method comprising the steps of:

providing an adhesive agent on the support member;

positioning the print element substrate relative to the support member; and adhering the print element substrate to the support member with the adhesive agent, wherein the first print element substrate includes a supply port communicating with the ejection port and having an elongated shape in the longitudinal direction of the print element substrate, a first surface surrounding the supply port, and a second surface provided along at least a part of an outer wall of print element substrate and along a long side of the rectangular shape, the print element substrate is positioned with respect to the support member such that the supply port, the first surface, and the second surface are opposed to the support member, the second surface is retracted from the first surface relative to the support member, and the first surface is opposed to the adhesive agent, and by pressing the print element substrate against the support member, the adhesive agent is filled in a first space between the first surface and the support member and at least a part of a second space between the second surface and the support member.

20. The method according to claim 19, wherein the print element substrate has a third surface connecting the first surface and the second surface.

* * * * *